(12) United States Patent
Kuriyama

(10) Patent No.: US 7,385,804 B2
(45) Date of Patent: Jun. 10, 2008

(54) SOLID ELECTROLYTIC CAPACITOR, ELECTRIC CIRCUIT, AND SOLID ELECTROLYTIC CAPACITOR MOUNTING STRUCTURE

(75) Inventor: Chojiro Kuriyama, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 0 days.

(21) Appl. No.: 10/567,975

(22) PCT Filed: Aug. 11, 2004

(86) PCT No.: PCT/JP2004/011558

§ 371 (c)(1),
(2), (4) Date: Feb. 10, 2006

(87) PCT Pub. No.: WO2005/015588

PCT Pub. Date: Feb. 17, 2005

(65) Prior Publication Data

US 2006/0285276 A1    Dec. 21, 2006

(30) Foreign Application Priority Data

Aug. 12, 2003 (JP) .............................. 2003-292652

(51) Int. Cl.
*H01G 9/04* (2006.01)
*H01G 9/145* (2006.01)
*H01G 4/228* (2006.01)

(52) U.S. Cl. .................. 361/532; 361/528; 361/540

(58) Field of Classification Search ........ 361/528–529, 361/532–533, 538, 540
See application file for complete search history.

(56) References Cited

U.S. PATENT DOCUMENTS

| 5,184,287 | A  |   | 2/1993 | Taniguchi |
| 6,741,451 | B2 | * | 5/2004 | Aoyama ..................... 361/528 |
| 7,167,357 | B2 | * | 1/2007 | Goldberger ................. 361/523 |
| 2004/0066607 | A1 | * | 4/2004 | Edson et al. ................ 361/528 |

FOREIGN PATENT DOCUMENTS

| JP | 58-30121 |   | 2/1983 |
| JP | 61-33635 |   | 10/1986 |
| JP | 4-367212 |   | 12/1992 |
| JP | 06267802 A | * | 9/1994 |
| JP | 2000-12387 |   | 1/2000 |
| JP | 2000-306774 |   | 11/2000 |
| JP | 2003-163137 |   | 6/2003 |
| JP | 2003-332173 |   | 11/2003 |

* cited by examiner

Primary Examiner—Eric Thomas
(74) Attorney, Agent, or Firm—Hamre, Schumann, Mueller & Larson, P.C.

(57) ABSTRACT

A solid electrolytic capacitor (A1) includes a porous sintered body (10) of metal particles or conductive ceramic particles, anode wires (11A, 11B) partially inserted in the porous sintered body (10), an anode terminal provided by portions of the anode wires (11A, 11B) which project from the porous sintered body (10), and a cathode (30) formed on an obverse surface of the porous sintered body (10). The anode terminal includes a first and a second anode terminals (11a, 11b), and circuit current flows from the first anode terminal (11a) toward the second anode terminal (11b) through the porous sintered body (10). Therefore, noise cancellation property can be enhanced with respect to a wide frequency band, and large electric power can be supplied with high responsiveness. In a circuit using the solid electrolytic capacitor (A1), the space efficiency on aboard can be enhanced, and the cost can be reduced.

11 Claims, 18 Drawing Sheets

SOLID ELECTROLYTIC CAPACITOR, ELECTRIC CIRCUIT, AND SOLID ELECTROLYTIC CAPACITOR MOUNTING STRUCTURE

TECHNICAL FIELD

The present invention relates to a solid electrolytic capacitor using a porous sintered body made of metal particles or conductive ceramic particles and having a valve action, and to an electric circuit.

BACKGROUND ART

Recently, an increase in clock speed in a device such as a CPU is being realized. Such a CPU with a high clock speed is likely to generate high frequency noises.

Generally, in a power supply line connecting a device such as a CPU to a power supply for supplying driving power to the device, a capacitor with a relatively large capacitance is utilized for bypassing high frequency noises generated in the device to the ground side (ground line side) to prevent the noises from entering the power supply.

Further, for a DC power supply, capacitors with a relatively large capacitance are connected in parallel to the output side so that the output power can be stabilized by repeating charge and discharge of the capacitors.

As a capacitor which is usable for the above-described purposes, a solid electrolytic capacitor is known.

An example of prior art solid electrolytic capacitor is disclosed in the following Patent Document 1. FIG. 26 shows the structure of the solid electrolytic capacitor disclosed in the Patent Document.

Patent Document 1: JP-A 2003-163137

The illustrated capacitor B is a resin-package-type solid electrolytic capacitor comprising a porous sintered body 90, an anode 90a, a cathode 90b, terminals 92, 93 and sealing resin 94. The porous sintered body 90 is prepared by compacting and sintering metal particles or conductive ceramic particles. As shown in FIG. 27, for example, the capacitor B is connected in parallel between a power supply 100 and a device 101. The noises generated from the device 101, are bypassed to the line of the negative pole side (the line with (−) in the figure), so that the noises are prevented from entering the power supply 100 side and influencing the power supply 100.

The capacitance of the capacitor B can be increased relatively easily by increasing the size of the porous sintered body 90. As is well known, a capacitor with a larger capacitance has a lower impedance, so that an ideal capacitor with a high capacitance has an excellent noise cancellation property for a low frequency band.

However, the capacitor B shown in FIG. 26 has equivalent series resistance Rx and equivalent series inductance Lx on the line between the anode 90a and the terminal 93 and on the line between the cathode 90b and the terminal 92, and has inherent self-resonant frequency determined by the equivalent series resistance Rx, the equivalent series inductance Lx and the equivalent capacitance C.

Therefore, although the capacitor B has a relatively low impedance and hence has sufficient noise cancellation property with respect to a certain frequency range around the self-resonant frequency, the noise cancellation property for the other ranges is not satisfactory.

Further, when the capacitor B is used for the stabilization of a DC power supply, transient response characteristics in outputting charge stored in the equivalent capacitance C of the capacitor B to the device pose a problem. Specifically, the smaller the time constant determined by the equivalent series resistance Rx and the equivalent series inductance Lx is, the more excellent the transient response characteristics are. In the structure shown in FIG. 26, the equivalent series resistance Rx and the equivalent series inductance Lx are relatively large due to the long lines between the anode 90a and the terminal 93 and between the cathode 90b and the terminal 92, so that the time constant cannot be reduced sufficiently. Therefore, sufficient transient response characteristics cannot be obtained, and there is a limitation on the high speed responsiveness.

FIG. 28 shows another example of usage of the prior art capacitor. In this example, a plurality of capacitors which are different from each other in capacitance and self resonant frequency are connected in parallel. With this arrangement, good noise cancellation property can be provided for a relatively wide frequency band, and the responsiveness can be enhanced. However, since it is difficult to adjust the characteristics such as self resonant frequency which are inherent in each capacitor, the noise cancellation property and the high speed responsiveness cannot be further enhanced. Moreover, the use of a plurality of capacitors is disadvantageous in terms of the space efficiency on a board and the cost.

DISCLOSURE OF THE INVENTION

The present invention is conceived under the circumstances described above. An object of the present invention is to provide a solid electrolytic capacitor which has good noise cancellation property for a wide frequency band and is capable of supplying large electric power with high responsiveness.

According to a first aspect of the present invention, there is provided a solid electrolytic capacitor comprising a porous sintered body of metal particles or conductive ceramic particles, an anode partially inserted in the porous sintered body, a first and a second anode terminals provided by portions of the anode which project from the porous sintered body, and a cathode formed on an obverse surface of the porous sintered body. Circuit current flows from the first anode terminal toward the second anode terminal through the porous sintered body. Herein, the "porous sintered body" in the present invention refers to one formed with a dielectric layer and a solid electrolytic layer in the inside and on the outer surface thereof.

Preferably, the anode comprises a plurality of anode wires.

Preferably, the anode comprises an anode wire having opposite ends projecting from the porous sintered body, and the first and the second anode terminals are provided by the opposite ends.

Preferably, the porous sintered body is made of niobium particles or niobium oxide particles.

Preferably, the porous sintered body is in the form of a flat plate.

Preferably, the porous sintered body includes a side surface standing in a thickness direction, and the first and the second anode terminals project from the side surface.

Preferably, the porous sintered body includes at least two side surfaces standing in a thickness direction, and the first and the second anode terminals project from the different side surfaces.

Preferably, the anode is flat in section.

Preferably, the porous sintered body is columnar or prismatic.

Preferably, the first anode terminal is higher in equivalent series inductance than the second anode terminal.

Preferably, the capacitor further comprises a first and a second cathode terminals electrically connected to the cathode, and circuit current flows from the first cathode terminal toward the second cathode terminal through the cathode.

Preferably, the first cathode terminal is higher in equivalent series inductance than the second cathode terminal.

Preferably, the cathode includes a pair of metal members sandwiching the porous sintered body.

Preferably, at least one of the paired metal members comprises a metal case accommodating the porous sintered body.

Preferably, conductive material intervenes between the paired metal members and the porous sintered body.

According to a second aspect of the present invention, there is provided a solid electrolytic capacitor comprising a porous sintered body of metal particles or conductive ceramic particles, an anode partially inserted in the porous sintered body, and a cathode formed on an obverse surface of the porous sintered body. The capacitor further comprises a first and a second cathode terminals electrically connected to the cathode, and circuit current flows from the first cathode terminal toward the second cathode terminal through the cathode.

According to a third aspect of the present invention, there is provided an electric circuit utilizing a solid electrolytic capacitor which comprises a porous sintered body of metal particles or conductive ceramic particles, an anode partially inserted in the porous sintered body, a first and a second anode terminals provided by the anode, and a cathode. Circuit current flows from the first anode terminal toward the second anode terminal.

Other features and advantages of the present invention will become clearer from the description given below with reference to the accompanying drawings.

BEST MODE FOR CARRYING OUT THE INVENTION

Preferred embodiments of the present invention will be described below in detail with reference to the accompanying drawings.

Figure 1:
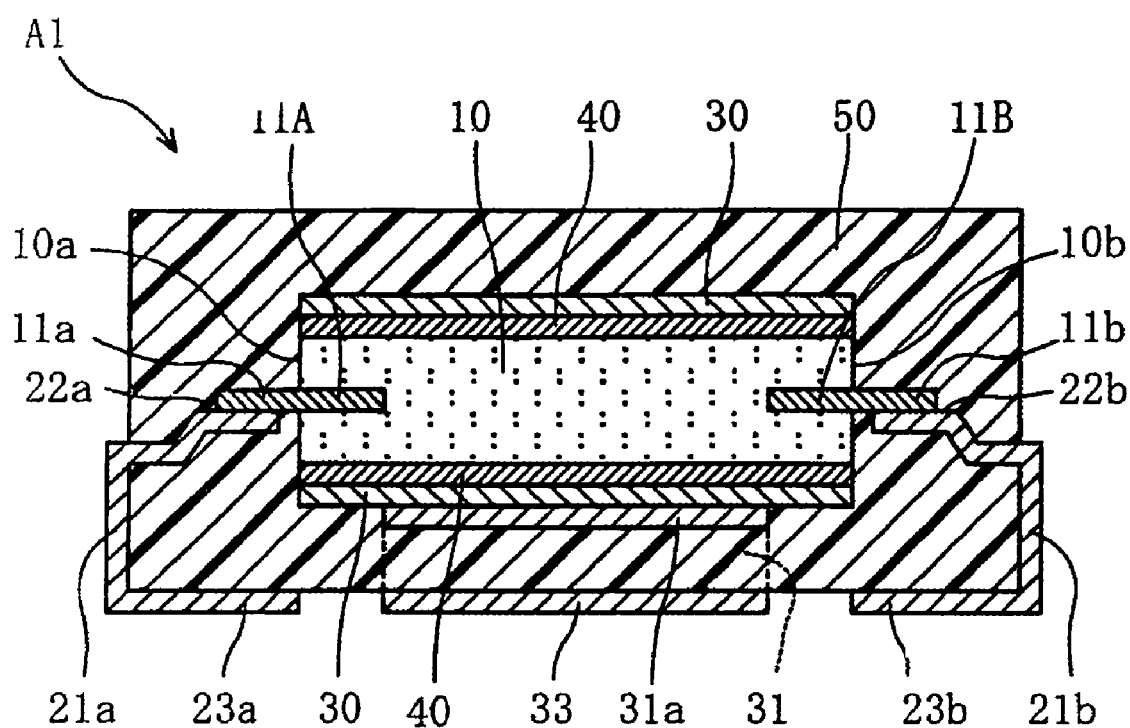
FIG. 1 is a sectional view showing a solid electrolytic capacitor according to a first embodiment of the present invention.
Figure 2:
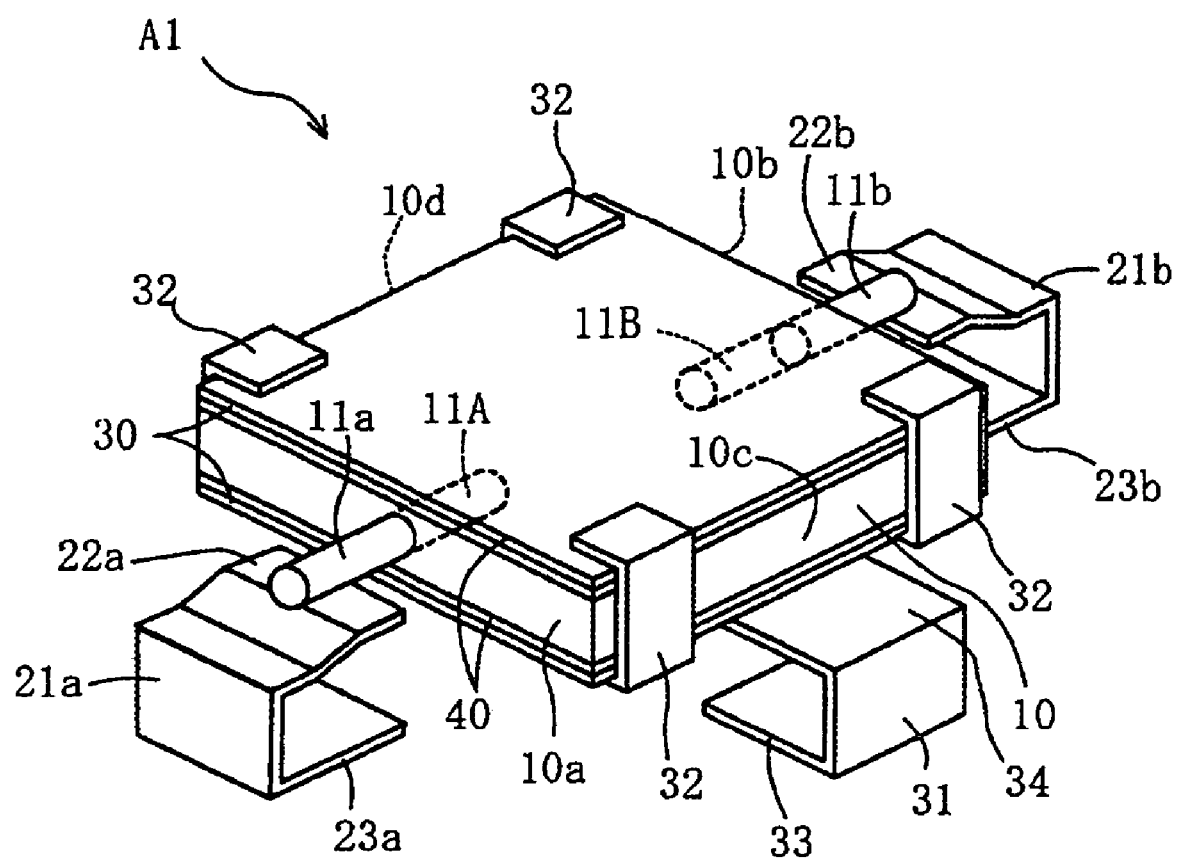
FIG. 2 is a perspective view showing a principal portion of the solid electrolytic capacitor of the first embodiment.

FIGS. 1 and 2 show a solid electrolytic capacitor according to a first embodiment of the present invention. FIG. 1 is a sectional view of the solid electrolytic capacitor, whereas FIG. 2 is a perspective view of the principal portion.

As shown in FIG. 1, the capacitor A1 includes a porous sintered body 10, two anode wires 11A and 11B, a cathode 30, leads 21a, 21b and 31, and a sealing resin 50. It is to be noted that the illustration of the sealing resin 50 is omitted in FIG. 2.

As shown in FIG. 2, the porous sintered body 10 is in the form of a rectangular plate. For instance, the porous sintered body 10 is made by compacting niobium powder or niobium oxide (NbO: conductive ceramic material) powder and then sintering the compacted body. The porous sintered body 10 thus formed has a relatively low equivalent series resistance. The "porous sintered body" in the present invention refers to one formed with a dielectric layer and a solid electrolytic layer (both not shown) in the inside and on the outer surface thereof. As the material of the porous sintered body 10, tantalum may be used instead of niobium or niobium oxide. Niobium is more flame retardant as compared with tantalum.

The two anode wires 11A and 11B may be made of niobium, for example. As shown in FIG. 1, the anode wires 11A and 11B are partially embedded in the porous sintered body 10 respectively through opposite side surfaces 10a and 10b of the porous sintered body. Therefore, the anode wire 11A and the anode wire 11B are electrically connected to each other via the porous sintered body 10. When a potential difference is applied between the anode wire 11A and the anode wire 11B, current flows between the anode wires through the porous sintered body 10.

The portions of the anode wires 11A, 11B which project out from the porous sintered body 10 constitute a first and a second anode terminals 11a and 11b for connection to the anode leads 21a and 21b. The two anode wires 11A and 11B are examples of anode of the present invention.

Each of the anode leads 21a and 21b is generally U-shaped in section. The anode lead 21a includes a stepped end 22a (hereinafter referred to as connection portion 22a) which is electrically and mechanically connected to the first anode terminal 11a of the anode wire 11A. Similarly, the anode lead 21b includes a stepped end 22b (hereinafter referred to as connection portion 22b) which is electrically and mechanically connected to the second anode terminal 11b of the anode wire 11B. The anode lead 21a further includes another end 23a constituting a terminal for a signal, line for mounting the capacitor A1 on a board (hereinafter referred to as a first anode mount terminal 23a). The anode lead 21b includes another end 23b constituting a terminal for a signal line for mounting the capacitor A1 on the board (hereinafter referred to as a second anode mount terminal 23b).

The cathode 30 comprises a pair of metal plates respectively bonded to an upper and a lower surfaces of the porous sintered body 10 by using conductive resin 40. The metal plates may be made of Cu-alloy or Ni-alloy, for example. As shown in FIG. 2, the paired metal plates 30 (hereinafter referred to as cathode plates 30) are short-circuited by two conductive members 32 at each of the side surfaces 10c and 10d of the porous sintered body 10.

The cathode lead 31 is generally U-shaped in section and includes an end 34 (upper end in FIG. 2) electrically connected to the metal plate bonded to the lower surface of the porous sintered body 10. The cathode lead 31 includes another end 33 constituting a terminal for a ground line for mounting the capacitor A1 on the board (hereinafter referred to as a cathode mount terminal 33).

As shown in FIG. 1, the porous sintered body 10 is sealed in the sealing resin 50, with the first and the second anode mount terminal 23a, 23b and the cathode mount terminal 33 exposed. The porous sintered body 10 provided with the cathode plates 30, and the portions of the anode wires 11a, 11b connected to the anode leads 21a, 21b are electrically and mechanically protected by the sealing member 50. The sealing member 50 also serves to fix the positions of the first and the second anode mount terminals 23a, 23b and the cathode mount terminal 33 of the capacitor A1.

The operation of the capacitor A1 will be described below, taking the electric circuit shown in FIG. 3 (circuit for preventing noise entry into a power source) as an example.

Figure 3:
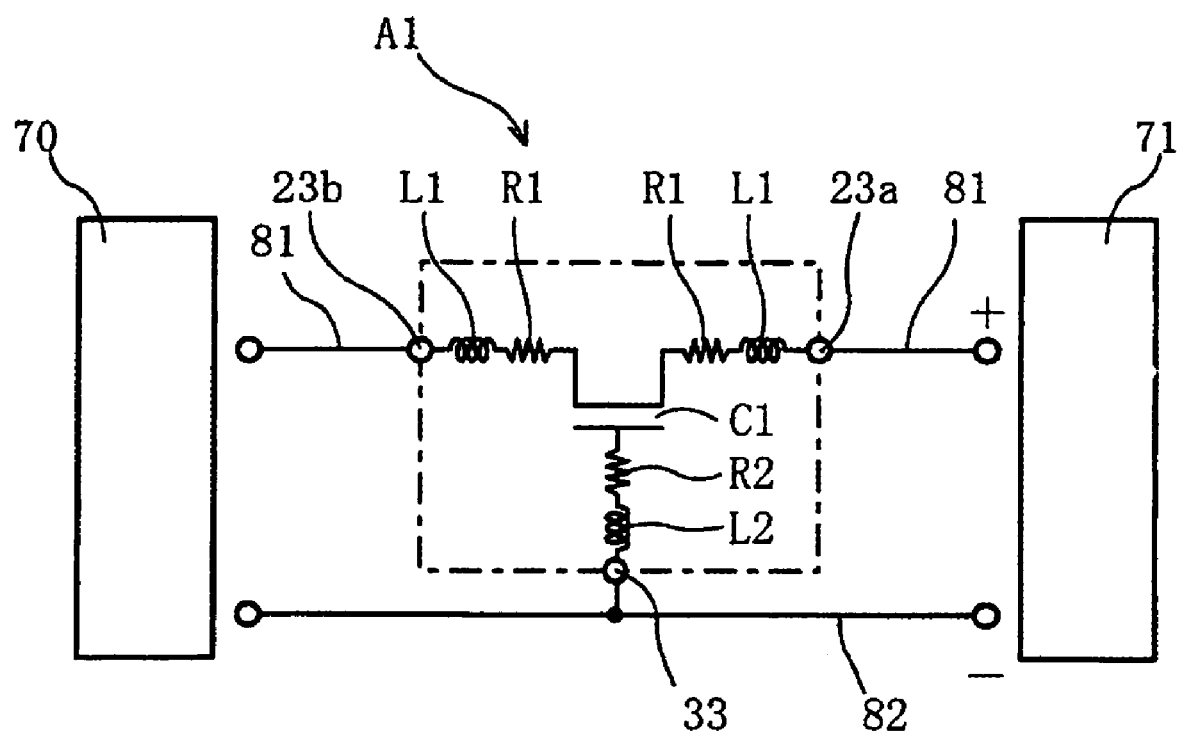
FIG. 3 shows an example of electric circuit utilizing the solid electrolytic capacitor of the first embodiment.

In the electric circuit shown in FIG. 3, the capacitor A1 is arranged on a signal line connecting a device 70 and a power supply 71 to each other. In the electric circuit, the capacitor A1 is used to suppress the leakage of unnecessary noise generated from the device 70 toward the power supply 71.

The device 70 may be a CPU or an IC, for example. The wiring 81 is a wiring of the positive pole for connecting the power supply 71 and the device 70 to each other. The wiring 82 is a wiring of the negative pole for connecting the device 70 and the power supply 71 to each other. The first anode mount terminal 23a is connected to the wiring 81 on the power supply 71 side, whereas the second anode mount terminal 23b is connected to the wiring 81 on the device side. The cathode mount terminal 33 is connected to the wiring 82. In this way, the capacitor A1 is connected between the device 70 and the power supply 71.

Because of the structure shown in FIGS. 1 and 2, the capacitor A1 has an equivalent circuit indicated in dot-and-dash lines in FIG. 3. The resistance R1 and the inductance L1 are the equivalent resistance R1 (hereinafter referred to as equivalent series resistance R1) and the equivalent inductance L1 (hereinafter referred to as equivalent series inductance L1) which the porous sintered body 10 has when current flows between the anode wire 11A and the anode wire 11B. As noted above, the anode wire 11A and the anode wire 11B are connected, respectively, to opposite side surfaces 10a and 10b of the porous sintered body 10. Therefore, the equivalent series resistance. R1 and the equivalent series inductance L1 are the equivalent resistance and inductance in the case where current flows in a direction along the upper and the lower surfaces of the porous sintered body 10.

The capacitance C1, the resistance R2 and the inductance L2 are the equivalent capacitance, resistance and inductance which the porous sintered body 10 has when current flows between the cathode plates 33 and the anode wires 11A, 11B (hereinafter referred to as equivalent capacitance C1, equivalent resistance R2 and equivalent inductance L2, respectively). As noted above, the cathode plates 33 are provided on the upper and the lower surfaces of the porous sintered body 10 in the form of a plate, and the anode wires 11A and 11B are arranged between the two cathode plates 33 (electrically short-circuited). Therefore, the equivalent capacitance C1, the equivalent resistance R2 and the equivalent inductance L2 are the equivalent capacitance, resistance and inductance in the case where current flows through the porous sintered body 10 in a direction perpendicular to the upper and the lower surface thereof.

As shown in FIG. 2, the capacitor A1 is a three-dimensional circuit, and current flows through the entirety of the porous sintered body 10 when voltage is applied between the anode wire 11A and the anode wire 11B, and the cathode plates 33. When the electric circuit of the capacitor A1 with respect to alternating current signals shown in FIG. 3 is replaced with a more specific equivalent circuit based on the crystal structure of the porous sintered body 10, the circuit shown in FIG. 3 becomes as shown in FIG. 4.

Figure 4:
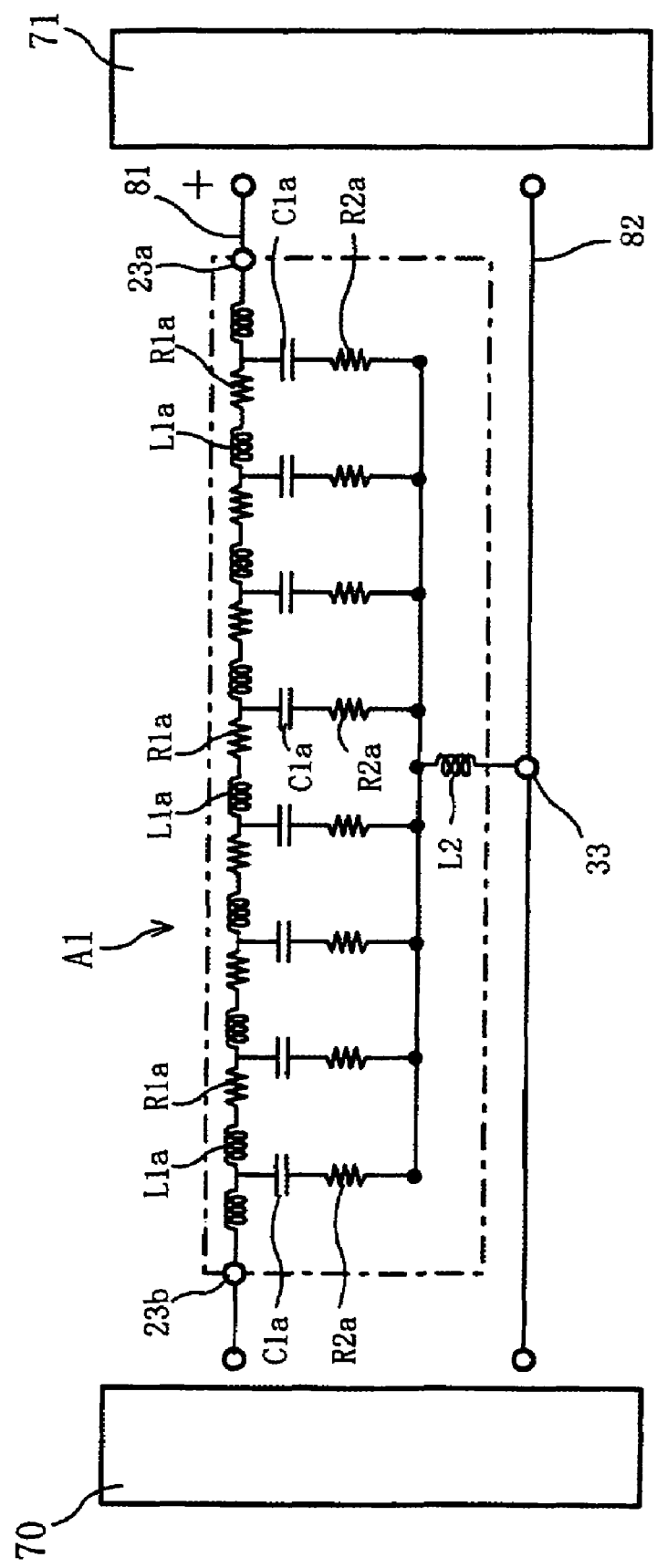
FIG. 4 shows an equivalent circuit of the electric circuit shown in FIG. 3.

As shown in FIG. 4, the capacitor A1 is represented as a circuit in which a plurality of series impedances each comprising series connection of inductance L1a and resistance R1a, and parallel admittances each comprising series connection of capacitance C1a and resistance R2a are connected to each other like a ladder. It is to be noted that the inductance between opposite ends of the ladder circuit and the first and the second anode mount terminals 23a, 23b is the inductance component which the anode leads 21a and 21b have. Further, the inductance L2 between the ladder circuit and the cathode plates 30 is the inductance component which the cathode lead 31 has.

According to this embodiment, the following advantages are obtained.

First, by the equivalent series inductance L1 in the capacitor A1, the noise cancellation property can be improved with respect to a high frequency band.

Specifically, when the high frequency noise generated in the device 70 travels toward the power supply 71 through the wiring 81, the equivalent series inductance L1 of the capacitor A1 acts as a resistance to the high frequency noise to prevent the input of the high frequency noise into the power supply 71.

Figure 26:
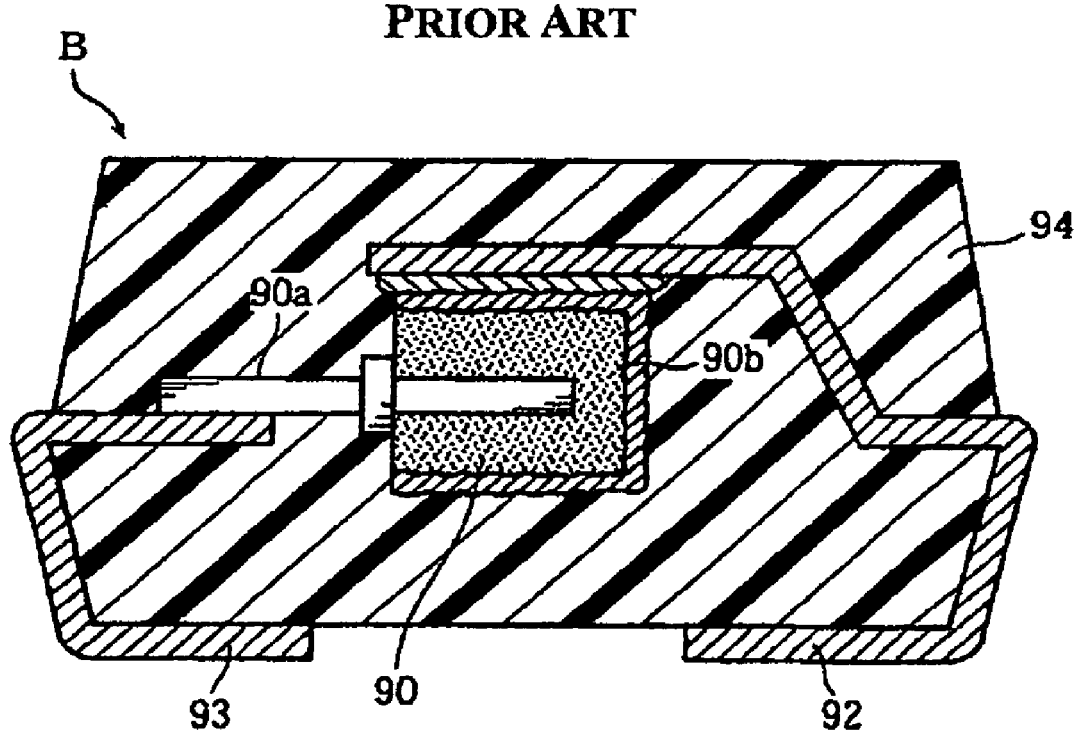
FIG. 26 is a sectional view showing an example of prior art solid electrolytic capacitor.
Figure 27:
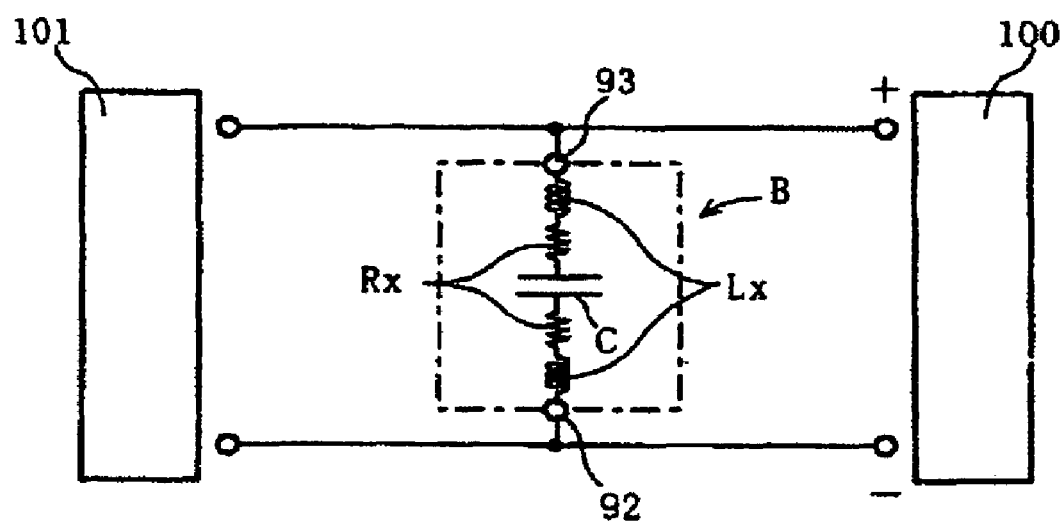
FIG. 27 shows an example of electric circuit utilizing the prior art solid electrolytic capacitor.
Figure 28:
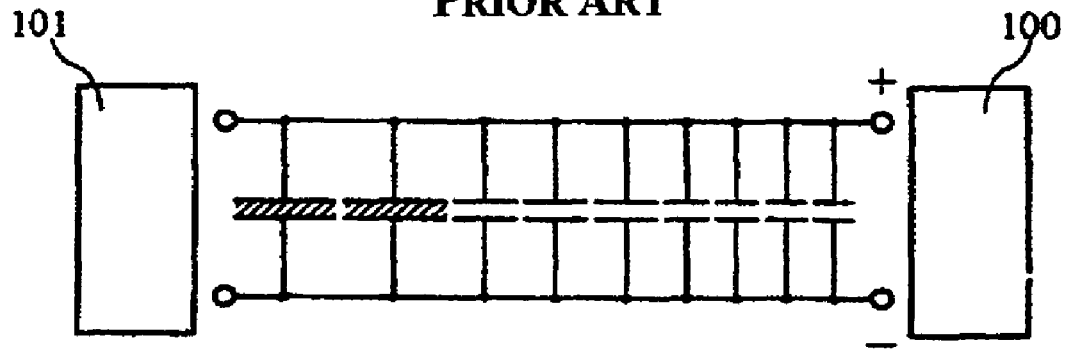
FIG. 28 shows an example of noise cancellation method utilizing the prior art solid electrolytic capacitor.

In the structure of the prior art capacitor B shown in FIG. 26, inductance corresponding to the series equivalent inductance L1 is not provided as shown in FIG. 27, so that the above advantage cannot be obtained.

When the distance between the anode wire 11A and the anode wire 11B in the porous sintered body 10 is increased, the number of steps of the ladder circuit shown in FIG. 4 increases, whereby the equivalent series inductance L1 increases. When the distance between the anode wire 11A and the anode wire 11B in the porous sintered body 10 is reduced, the number of steps of the ladder circuit shown in FIG. 4 reduces, whereby the equivalent series inductance reduces.

Therefore, by appropriately setting the distance between the anode wire 11A and the anode wire 11B in the porous sintered body 10, noises of an intended high frequency band can be properly prevented from entering the power supply 71.

Secondly, the equivalent capacitance C1 of the capacitor A1 can be increased, and the noise cancellation property can be improved with respect to a wide frequency band.

Specifically, when the high frequency noise generated in the device 70 enters the capacitor A1 through the wiring 81, the high frequency noise is bypassed to the wiring 82 (negative pole side) by the equivalent capacitance C1 shown in FIG. 3, whereby the noise is prevented from entering the power supply 71.

The larger the equivalent capacitance C1 is, the lower the impedance in bypassing AC signals from the wiring 81 to the wiring 82 is. Therefore, the noise entered the capacitor A1 through the wiring 81 can be bypassed with respect to a wide frequency range to the wiring 82 (negative pole side) by the equivalent capacitance C1, so that the noise is prevented from entering the power supply 71.

The equivalent capacitance C1 of the equivalent circuit shown in FIG. 3 is the total of parallel admittances C1a in the ladder circuit shown in FIG. 4, so that the equivalent capacitance C1 increases as the number of parallel admittances increases. The parallel admittances of the ladder circuit increase as the area of the porous sintered body 10 in plan view increases and as the thickness decreases. Therefore, as compared with the structure of the prior art capacitor B shown in FIG. 26, the equivalent capacitance C1 can be increased easily.

In this way, as compared with the prior art capacitor B, the capacitor A1 of this embodiment can easily increase the equivalent capacitance C1 and enhance the noise cancellation property with respect to a wide frequency band.

Thirdly, the flat plate-like configuration of the porous sintered body 10 further enhances the noise cancellation property.

Specifically, since the thickness of the porous sintered body 10 is relatively small, the length of the conduction path of the current flowing through the porous sintered body 10 in the thickness direction is relatively short. Therefore, the equivalent resistance R2a becomes small while the capacitance C1a is relatively large, so that the equivalent resistance R2 becomes small while the equivalent capacitance C1 is large. Therefore, the noise, which is alternating current entered through the wiring 81, can be easily bypassed toward the wiring 82 (negative pole side). Therefore, the noise can be properly removed with respect to a wide frequency band.

Fourthly, the capacitor A1 has enhanced mechanical strength owing to the structure of the cathode plates 30.

Specifically, as shown in FIG. 2, the cathode plates 30 comprising a pair of metal plates are arranged to sandwich the porous sintered body 10 in the form of a plate from above and below. The cathode plates 30 are bonded to the upper and the lower surfaces of the porous sintered body 10 relatively strongly by using the conductive resin 40. Therefore, in the capacitor A1, the upper and the lower surfaces of the porous sintered body 10, which fulfils the main function as the electric circuit, are protected by the metal plates 30 with high mechanical strength. Therefore, even if the capacitor A1 is electrically connected with reverse polarity and hence excessively heated, the large deformation of the capacitor A1 and the formation of a crack in the sealing resin 50 can be prevented.

In the process for forming a dielectric layer in the porous sintered body 10, not only the porous sintered body 10 but also the portions of the anode wires 11A and 11B which are inserted in the porous sintered body are immersed in an aqueous solution of phosphoric acid, for example. Since the anode wires 11A and 11B are made of niobium, the dielectric layer is formed on the surfaces of the anode wires. Thereafter, the solid electrolytic layer is formed to cover the dielectric layer. Therefore, direct electrical connection between the anode wires 11A, 11B and the solid electrolytic layer can be prevented properly.

As noted above, as compared with the prior art capacitor, the capacitor A1 has excellent noise cancellation property for a wide frequency band. Therefore, in the electric circuit as shown in FIG. 3, the enhancement of noise cancellation can be achieved by using a smaller number of capacitors than in using the prior art capacitors. Therefore, the space efficiency on a board can be improved and the manufacturing cost can be reduced.

FIGS. 5-25 illustrate other embodiments of solid electrolytic capacitor according to the present invention. In these figures, the elements which are identical or similar to those of the first embodiment are designated by the same reference signs as those used for the first embodiment, and the detailed description thereof is omitted.

The four embodiments shown in FIGS. 5-9 differ from the foregoing embodiment in number of the first and the second anode terminals 11a, 11b and arrangement of the anode terminals relative to the porous sintered body 10. It is to be noted that the cathode plates, the sealing resin and terminals for surface-mounting are not illustrated in FIGS. 5-9.

Figure 5:
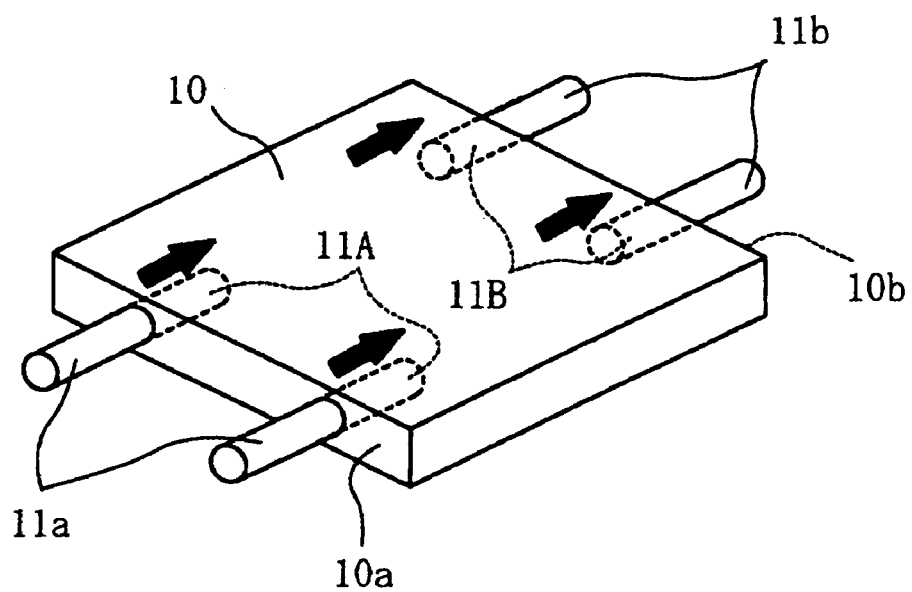
FIG. 5 is a perspective view showing a principal portion of a solid electrolytic capacitor according to a second embodiment of the present invention.

In the second embodiment shown in FIG. 5, four anode wires 11A and 11B, and hence, a pair of first anode terminals 11a and a pair of second anode terminals 11b are provided. The pair of first anode terminals 11a project from a side surface 10a of the porous sintered body 10, whereas the pair of second anode terminals, 11b project from the opposite side surface 10b of the porous sintered body 10.

According to this embodiment, as indicated by arrows in FIG. 5, the circuit current flows into the porous sintered body 10 while dispersing into the two first anode terminals 11a and flows out of the porous sintered body 10 while dispersing into the two second anode terminals 11b. Therefore, the amount of current flowing through each of the first and the second anode terminals 11a and 11b is reduced. Accordingly, heating of the first and the second anode terminals 11a and 11b can be suppressed.

Figure 6:
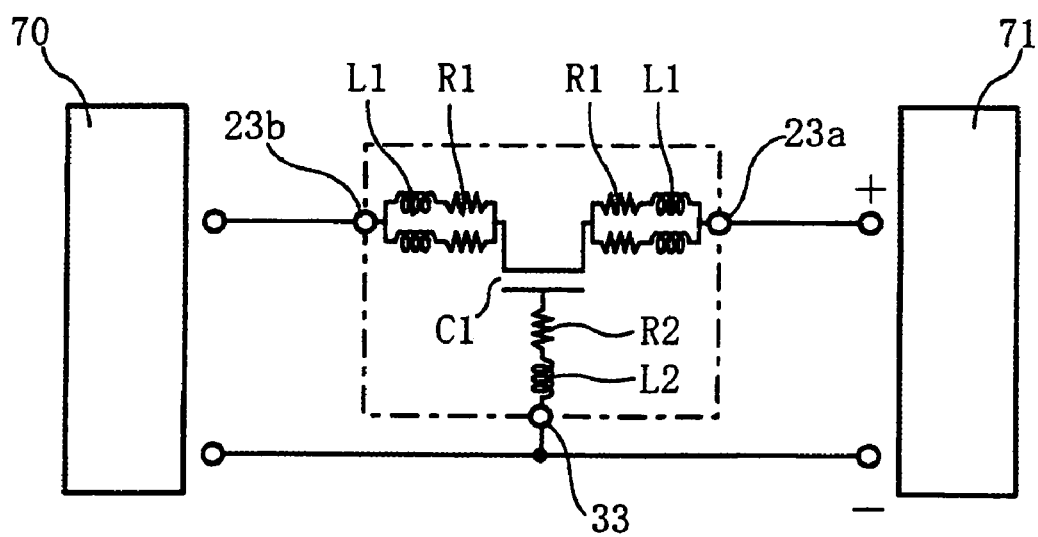
FIG. 6 shows an example of electric circuit utilizing the solid electrolytic capacitor according to the second embodiment.

FIG. 6 shows the equivalent circuit of the capacitor A1 of the second embodiment. In this embodiment, since two first anode terminals 11a and two second anode terminals 11b are provided, two series connections of equivalent series resistance R1 and equivalent series inductance L1 are connected in parallel on each of opposite sides of the equivalent capacitance C1 of the capacitor A1.

Therefore, as compared with the embodiment shown in FIG. 2, the equivalent series resistance R1 and the equivalent series inductance L1 on opposite sides of the equivalent capacitance C1 of the capacitor A1 is reduced.

When the capacitor A1 of the second embodiment is utilized for stabilizing the power supply to the device 70, since the equivalent series inductance L1 between the equivalent capacitance C1 and the first anode mount terminal 23a or the second anode mount terminal 23b is small, the time constant based on the equivalent series inductance L1 is small. Therefore, the transient response characteristics in supplying stored charge from the equivalent capacitance C1 to the device 70 can be improved. Thus, the capacitor can supply a large amount of electric power with high responsiveness in accordance with high frequency.

Figure 7:
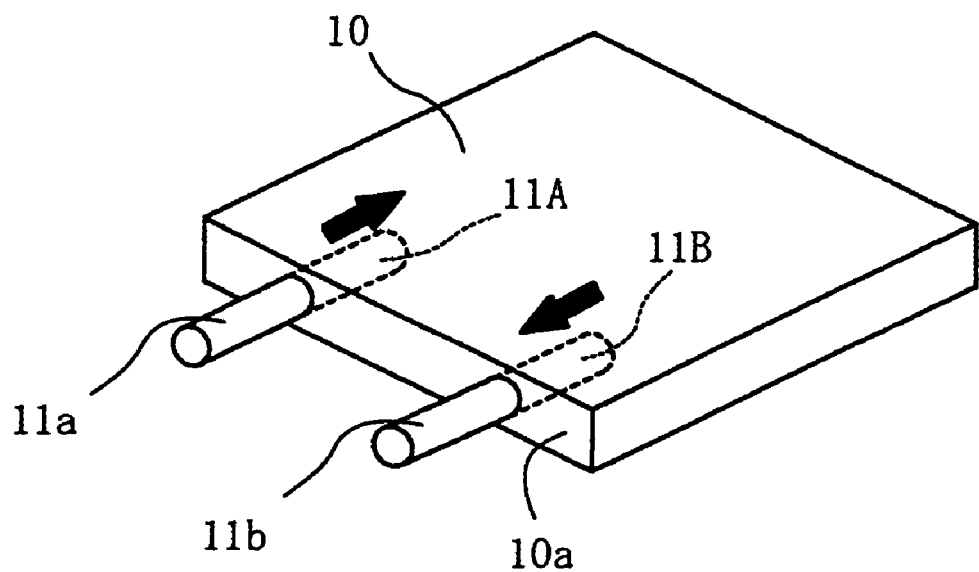
FIG. 7 is a perspective view showing a principal portion of a solid electrolytic capacitor according to a third embodiment of the present invention.

In the third embodiment shown in FIG. 7, both of the first and the second anode terminals 11a and 11b project from the side surface 10a.

According to the third embodiment, the first and the second anode mount terminals (not shown) are provided on the side surface 10a side. Therefore, in mounting the capacitor A1 on a board, the wiring 81 for the capacitor A1 can be collectively provided on one side, i.e. on the side surface 10a side of the capacitor A2. Therefore, the wiring 81 can be efficiently arranged on the board while avoiding unfavorable interference with the parts mounted around the capacitor A1.

Figure 8:
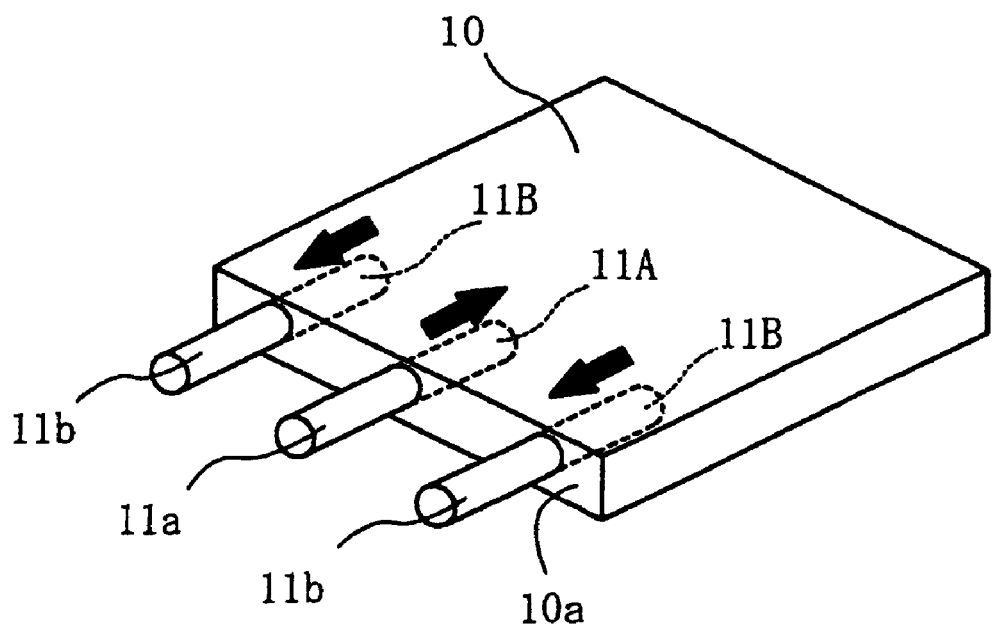
FIG. 8 is a perspective view showing a principal portion of a solid electrolytic capacitor according to a fourth embodiment of the present invention.

In the fourth embodiment shown in FIG. 8, a single first anode terminal 11a and a pair of second anode terminals 11b are arranged to project from one side surface 10a. With such an arrangement, the equivalent series inductance between the equivalent capacitance C1 and the second anode terminals 11b (hereinafter referred to as output equivalent series inductance) can be made smaller than the equivalent series inductance between the equivalent capacitance C1 and the first anode terminal 11a (hereinafter referred to as input equivalent series inductance).

According to the fourth embodiment, when the capacitor A1 is used for high frequency noise cancellation for a power supply, the input side of high frequency noise is set to the first anode terminal 11a which provides the high input equivalent series inductance. With this arrangement, noise in a high frequency band can be properly removed. When the capacitor A1 is used for stabilizing power supply, the output side of stored charge from the equivalent capacitance C1 is set to the second anode terminals 11b which provides the low equivalent series inductance. With this arrangement, current can be discharged with sharp rising. Therefore, the capacitor is suitable for enhancing noise cancellation property for a high frequency band and realizing power supply with high responsiveness.

Figure 9:
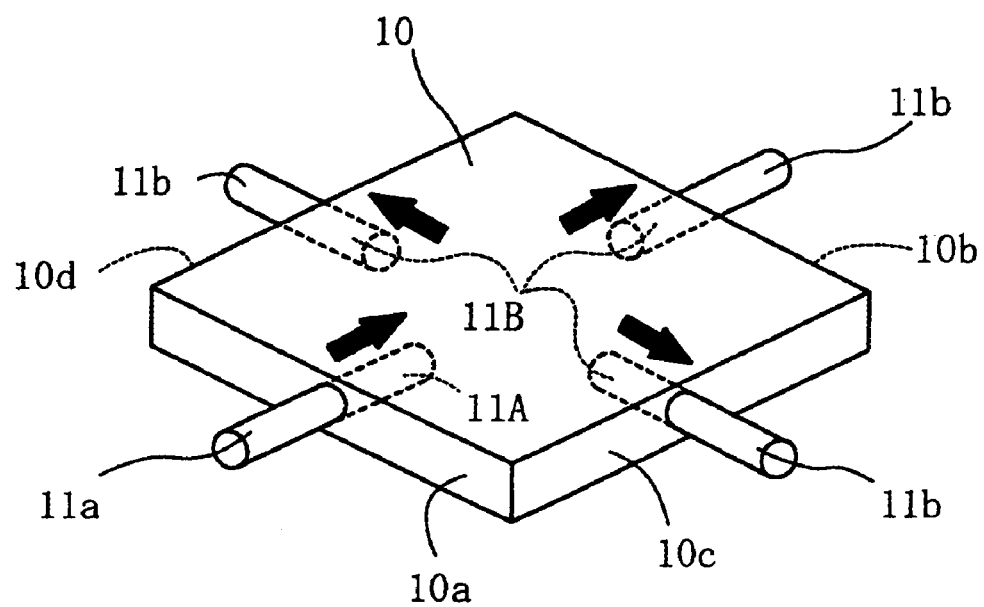
FIG. 9 is a perspective view showing a principal portion of a solid electrolytic capacitor according to a fifth embodiment of the present invention.

In the fifth embodiment shown in FIG. 9, a single first anode terminal 11a and three second anode terminals 11b are provided. The first anode terminal 11a projects from a side surface 10a. The three second anode terminals 11b project from other three side surfaces 10b, 10c and 10d, respectively.

According to the fifth embodiment, the first anode terminal 11a may be connected to a power supply, whereas the three second anode terminals 11b may be connected to three devices, respectively. In this case, noise generated from the three devices can be prevented from entering the power supply. The three second anode terminals 11b extend generally perpendicularly and radially. Therefore, the devices 70 for connection to the three second anode terminals 11b can be arranged so as not to interfere with each other.

Figure 10:
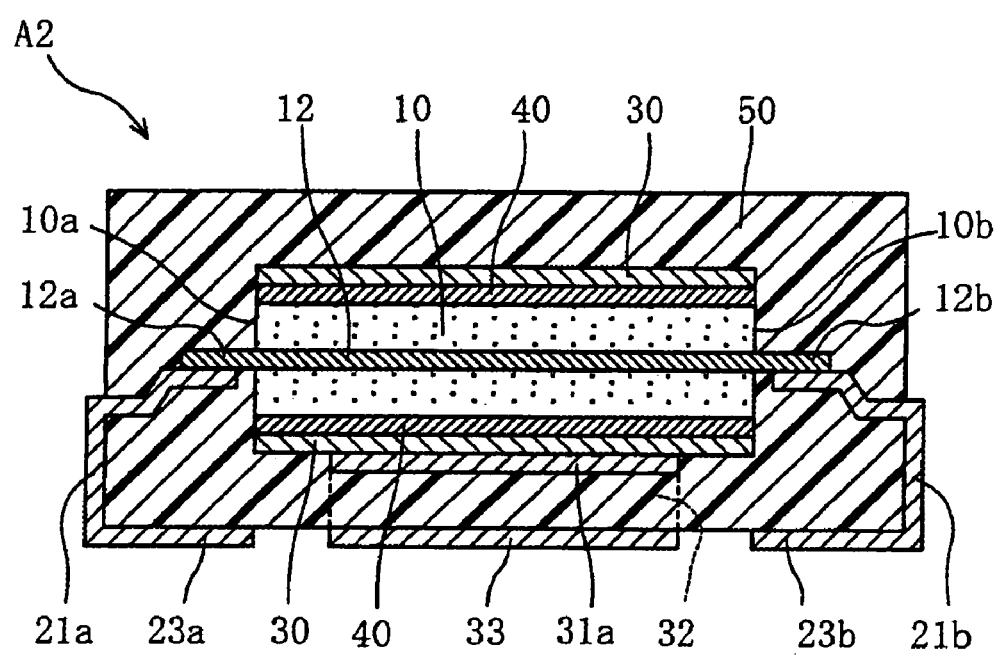
FIG. 10 is a sectional view showing a solid electrolytic capacitor according to the present invention.

Next, with reference to FIGS. 10 and 11, a solid electrolytic capacitor according to a sixth embodiment of the present invention will be described.

In the sixth embodiment, a single anode wire 12 is provided instead of the two anode wires 11A and 11B in the first embodiment (FIGS. 1-3). The anode wire 12 penetrates through the porous sintered body 10, and the opposite ends thereof project from the porous sintered body 10. The opposite ends serve as a first and a second anode terminals 12a and 12b.

Figure 11:
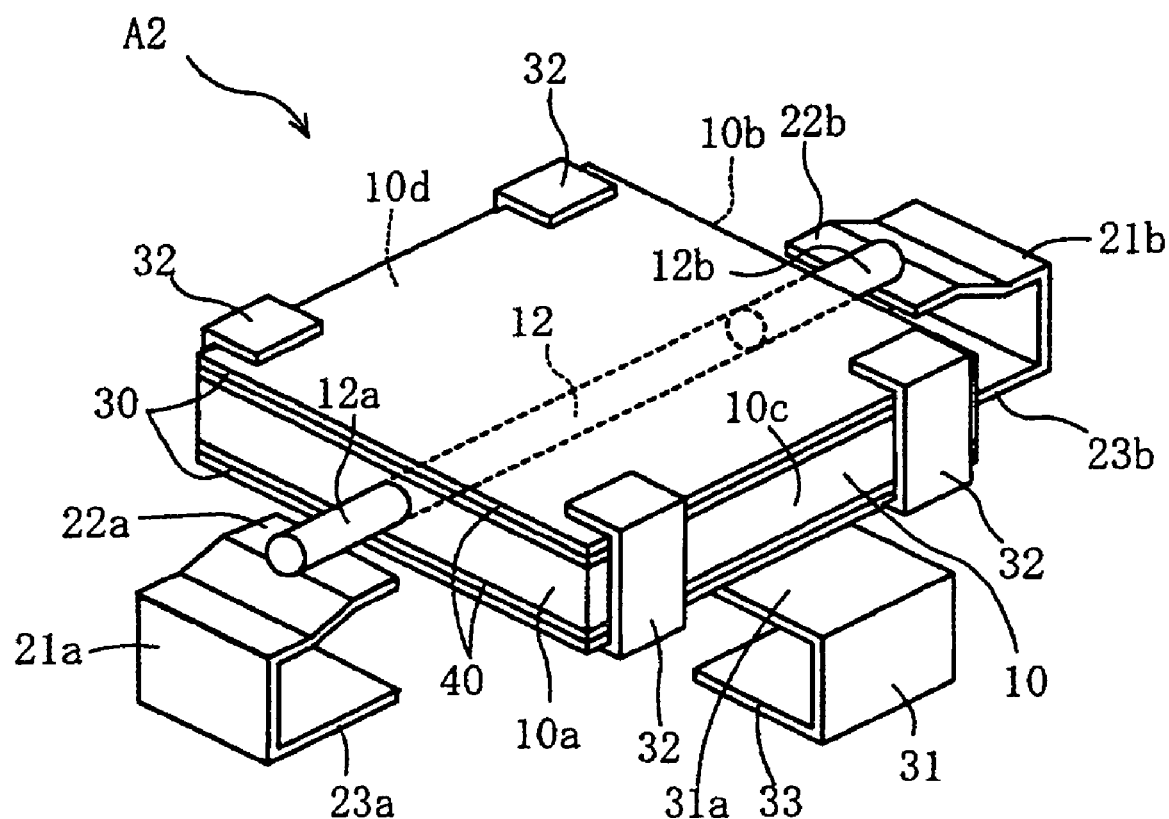
FIG. 11 is a perspective view showing a principal portion of a solid electrolytic capacitor according to a sixth embodiment.

As shown in FIG. 11, the first anode terminal 12a of the anode wire 12 is electrically and mechanically connected to the connection portion, 22a of the anode lead 21a, whereas the second-anode terminal 12b of the anode wire 12 is electrically and mechanically connected to the connection portion 22b of the anode lead 21b. It is to be noted that, similarly to FIG. 2, sealing resin 5-0 is not illustrated in FIG. 11.

Since the porous sintered body 10 contains a large number of minute pores, the electrical resistance is relatively high. According to the sixth embodiment, however, since the anode wire 12 has a solid structure, its electrical resistance can be made lower than that of the porous sintered body 10.

In the first embodiment (FIGS. 1-3), since the equivalent series resistance R1 of the porous sintered body 10 is relatively high, the electrical loss at the equivalent series resistance R1 is large. According to the sixth embodiment, however, the equivalent series resistance R1 between the first and the second anode terminals 12a and 12b is reduced due to the use of the single anode wire 12, and most part of the current inputted into the capacitor A1 flows through the anode wire 12. Therefore, electrical loss in the capacitor A1 can be reduced. Moreover, since the current flowing through the porous sintered body 10 is reduced, the heating of the porous sintered body 10 can be suppressed.

Figure 12:
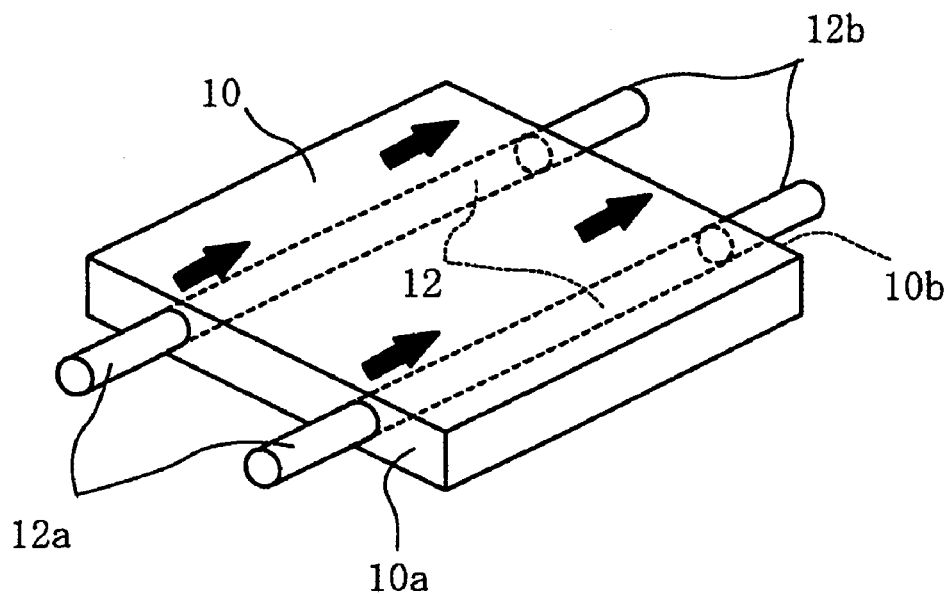
FIG. 12 is a perspective view showing a principal portion of a solid electrolytic capacitor according to a seventh embodiment of the present invention.
Figure 13:
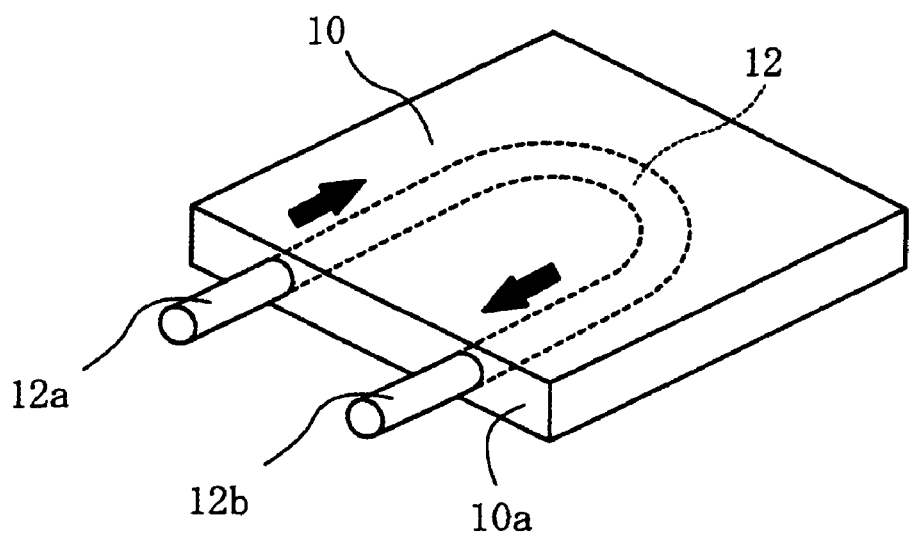
FIG. 13 is a perspective view showing a principal portion of a solid electrolytic capacitor according to an eighth embodiment of the present invention.

FIGS. 12 and 13 show solid electrolytic capacitors according to a seventh and an eighth embodiments of the present invention, respectively. These embodiments differ from the sixth embodiment (FIGS. 10 and 11) only in number of the first and the second anode terminals 12a, 12b and the arrangement of the anode terminals relative to the porous sintered body 10.

In the seventh embodiment shown in FIG. 12, a single anode wire 12 is provided instead of each pair of anode wires 11A, 11B of the second embodiment (FIG. 5). Each of the anode wires 12 penetrates through the porous sintered body 10.

According to the seventh embodiment, in the equivalent circuit shown in FIG. 6, the equivalent series resistance R1 of each anode wire 12 can be reduced. Therefore, the equivalent series resistance between the first anode mount terminal 23a and the second anode mount terminal 23b (the combined resistance of the equivalent series resistances R1 of the two anode wires 12) can be reduced, whereby electrical loss at the capacitor A1 can be further suppressed. Moreover, since the equivalent series inductance L1 of each anode wire 12 can be reduced, the equivalent series inductance between the first anode mount terminal 23a and the second anode mount terminal 23b (the combined inductance of the equivalent series inductances L1 of the two anode wires 12) can be reduced. Therefore, power supply with high responsiveness can be realized.

In the eighth embodiment shown in FIG. 13, a single anode wire 12 bent into a U-shape is provided instead of the anode wires 11A and 11B of the third embodiment (FIG. 7). The anode wire 12 penetrates through the porous sintered body 10.

In the eighth embodiment, owing to the use of the single anode wire 12, the equivalent series resistance R1 between the first and the second anode terminals 12a and 12b is smaller than in the third embodiment (FIG. 7). Since most part of the current inputted into the capacitor A1 flows through the anode wire 12, electrical loss in the capacitor A1 can be reduced. Further, since the current flowing through the porous sintered body 10 can be reduced, heating of the porous sintered body 10 can be suppressed.

Figure 14:
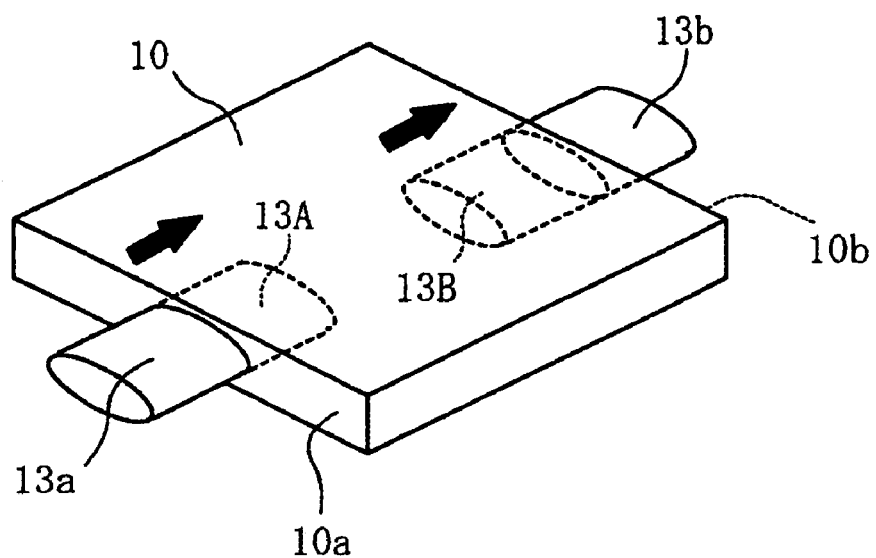
FIG. 14 is a perspective view showing a principal portion of a solid electrolytic capacitor according to a ninth embodiment of the present invention.

As shown in FIGS. 14, the height of anode wires 13A and 13B in the figure needs to be smaller than the thickness of the porous sintered body 10. In the ninth embodiment, the anode wires 13A and 13B have a width which is larger than the height. With such a structure, the sectional area of the anode wires 13A and 13B can be advantageously increased. Accordingly, the electrical resistance of the anode wires 13A and 13B can be reduced, whereby electrical loss can be suppressed.

Figure 15:
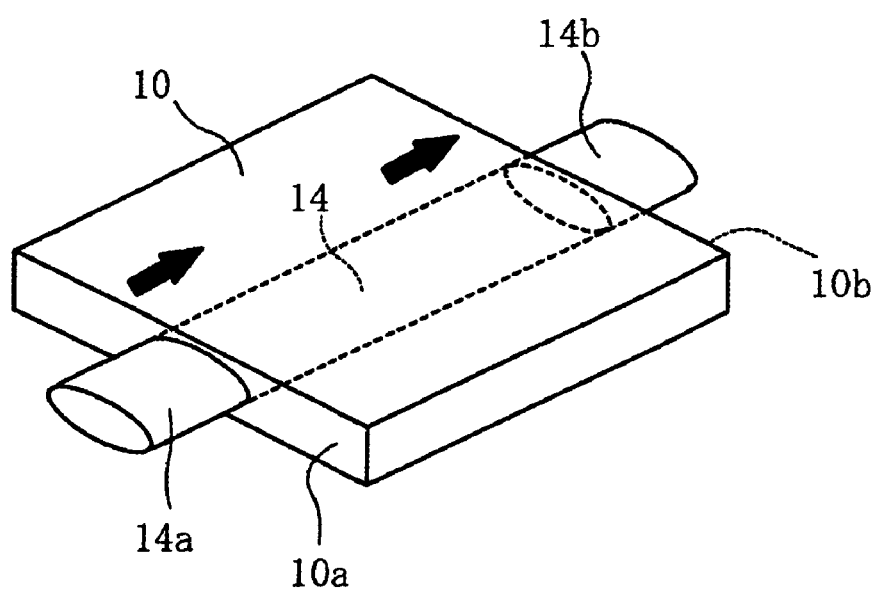
FIG. 15 is a perspective view showing a principal portion of a solid electrolytic capacitor according to a tenth embodiment of the present invention.

FIG. 15 shows a solid electrolytic capacitor according to a tenth embodiment of the present invention. The capacitor according to this embodiment includes a porous sintered body 10 in the form of a flat plate, and an anode wire 14 having a flat section. The anode wire 14 penetrates through the porous sintered body 10. In this embodiment, since the single anode wire 14 penetrates through the porous sintered body 10, the resistance can be further reduced as compared with the ninth embodiment (FIG. 14).

Figure 16:
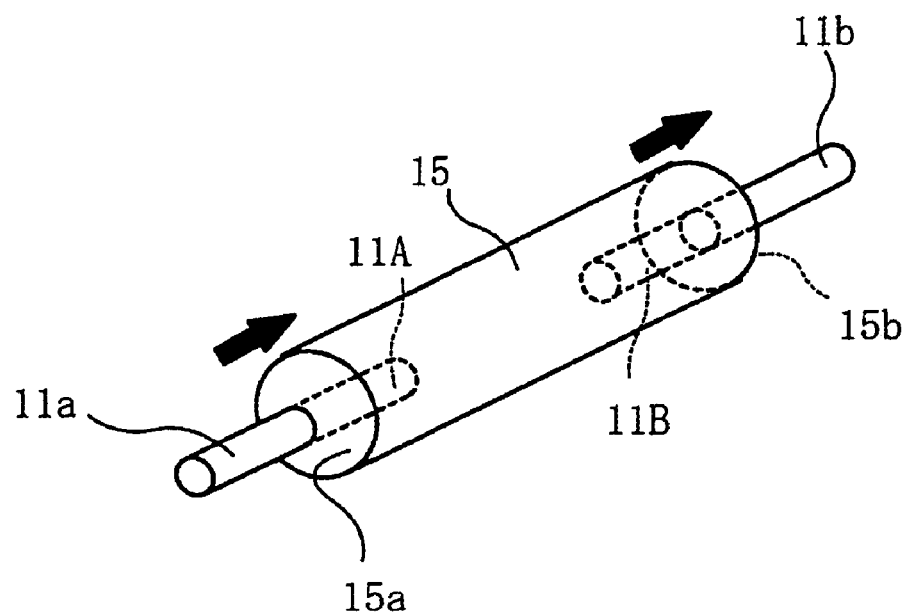
FIG. 16 is a perspective view showing a principal portion of a solid electrolytic capacitor according to an eleventh embodiment of the present invention.

In an eleventh embodiment shown in FIG. 16, the porous sintered body 15 is columnar and includes two end surfaces 15a and 15b spaced in the longitudinal direction. The first anode terminal 11a is provided at one end surface 15a to be partially inserted in the porous sintered body, whereas the second anode terminal 11b is provided at the other end surface 15b to be partially inserted in the porous sintered body.

Figure 17:
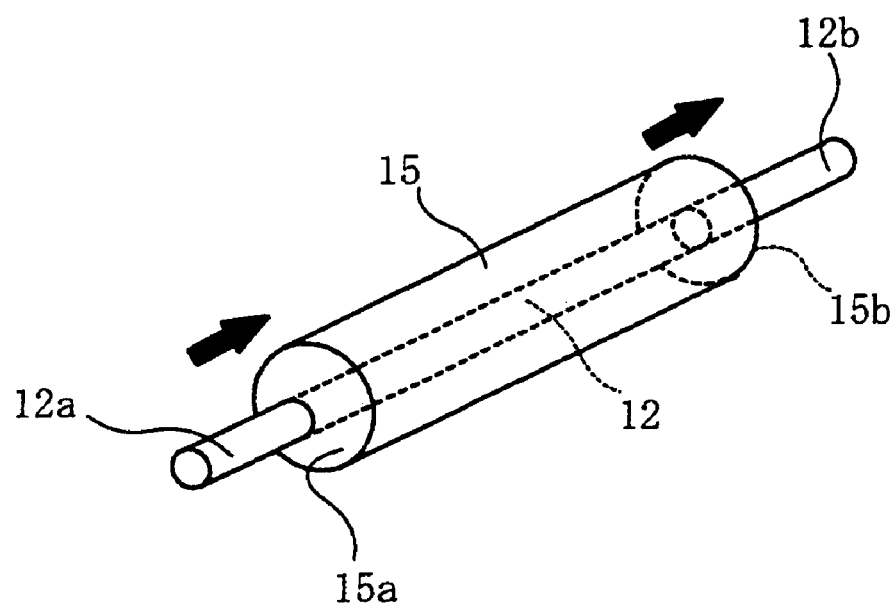
FIG. 17 is a perspective view showing a principal portion of a solid electrolytic capacitor according to a twelfth embodiment of the present invention.

In a twelfth embodiment shown in FIG. 17, a single anode wire 12 penetrates through a columnar porous sintered body 15. Such a structure is advantageous for increasing the length of the anode wire 12 to reduce the resistance. The configuration of the porous sintered body 15 is not limited to columnar, and any other configurations such as a prismatic configuration may be employed as long as it has a uniform cross section and is elongated in one direction.

Next, with reference to FIGS. 18 and 19, a solid electrolytic capacitor according to a thirteenth embodiment of the present invention will be described.

Figure 18:
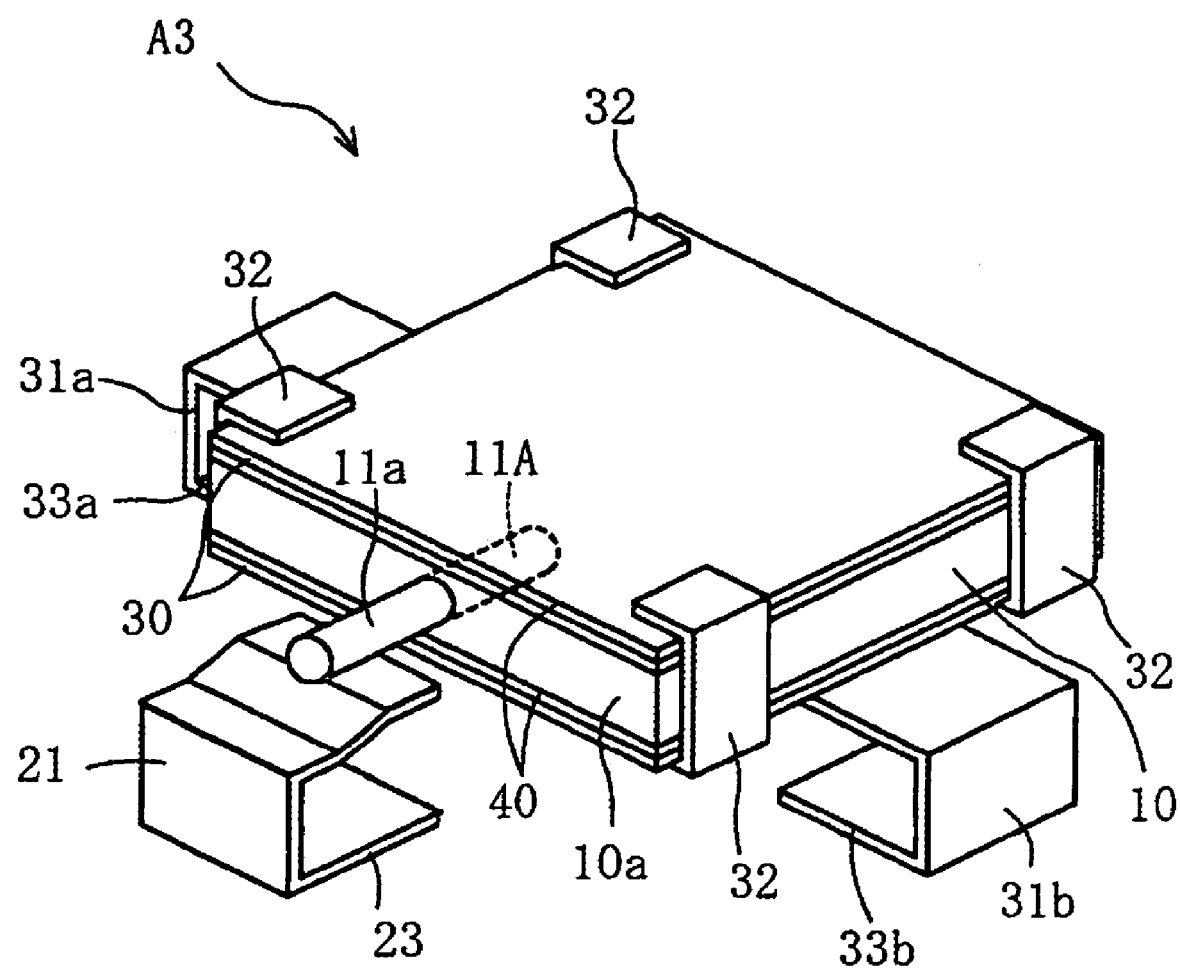
FIG. 18 is a perspective view showing a principal portion of a solid electrolytic capacitor according to a thirteenth embodiment of the present invention.

As shown in FIG. 18, the capacitor A3 in the thirteenth embodiment includes two cathode leads 31a and 31b. Each of the cathode leads 31a and 31b has a configuration similar to that of the anode lead 21, and one end of each cathode lead (upper end in FIG. 18) is electrically connected to the cathode plate 30 bonded to the lower surface of the porous sintered body 10. The other end 33a of the cathode lead 31a constitutes a terminal for a ground line (hereinafter referred to as a first cathode mount terminal 33a) for mounting the capacitor A3 on a board. The other end 33b of the cathode lead 31b constitutes a terminal for a ground line (hereinafter referred to as a second cathode mount terminal 33b) for mounting the capacitor A3 on a board.

Figure 19:
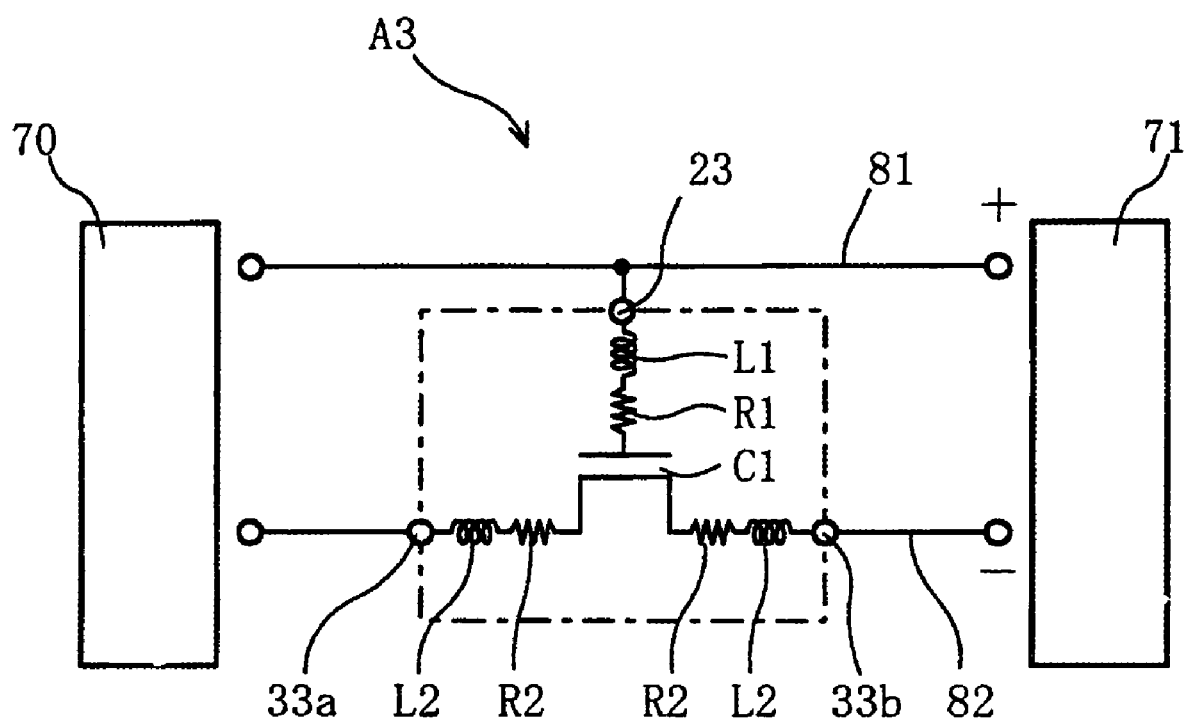
FIG. 19 shows an example of electric circuit utilizing the solid electrolytic capacitor according to the thirteenth embodiment.

In the electric circuit shown in FIG. 19, the capacitor A3 is arranged on a signal line connecting a device 70 and a power supply 71 to each other. In the electric circuit shown in the figure, the capacitor A3 is used to suppress the leakage of unnecessary noise generated from the device 70 toward the power supply 71.

The first and the second cathode mount terminals 33a and 33b are connected to the wiring 82 of the negative pole side from the power supply 71 to the device 70. Therefore, the cathode plates 30 are connected in series in the wiring 82. The equivalent series inductance L2 is the inductance component of the cathode plates 30 and the cathode leads 31a, 31b shown in FIG. 18.

In the thirteenth embodiment, the anode and the cathode in the equivalent circuit of the capacitor A1 of the first embodiment shown in FIG. 3 are substantially reversed. Therefore, similarly to the first embodiment shown in FIGS. 1-3, noise of a high frequency band included in the circuit current is properly blocked, and the noise cancellation property for a high frequency band can be enhanced.

Figure 20:
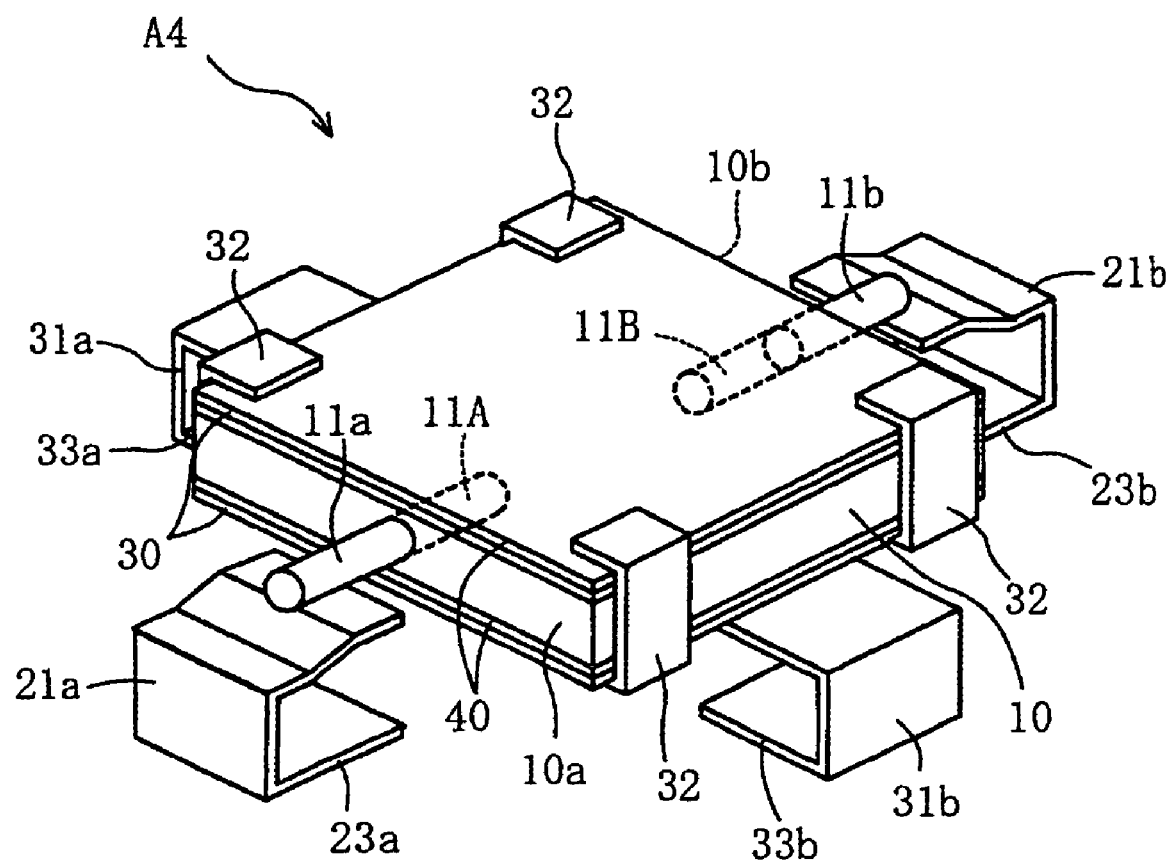
FIG. 20 is a perspective view showing a principal portion of a solid electrolytic capacitor according to a fourteenth embodiment of the present invention.
Figure 21:
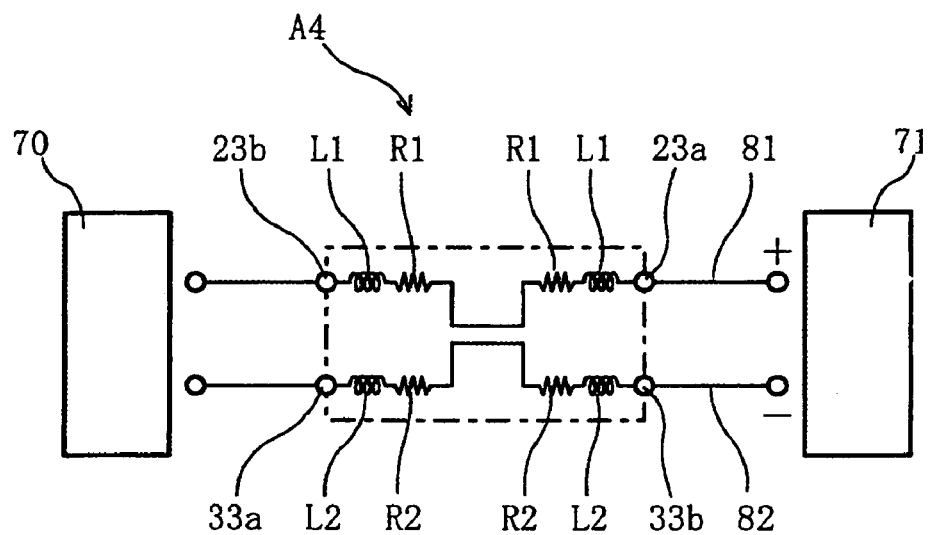
FIG. 21 shows an example of electric circuit utilizing the solid electrolytic capacitor according to the fourteenth embodiment.

FIGS. 20 and 21 show a solid electrolytic capacitor according to a fourteenth embodiment of the present invention. The capacitor A4, shown in FIG. 20 includes a first and a second anode mount terminals 23a, 23b and a first and a second cathode mount terminals 33a, 33b.

The structure of the fourteenth embodiment differs from that of the thirteenth embodiment shown in FIG. 18 in that an anode wire 11B is additionally provided at the side surface 10b of the porous sintered body 10 and an anode lead 21b is connected to the second anode terminal 11b of the anode wire 11B.

FIG. 21 shows an electric circuit utilizing the capacitor A4. In the illustrated electric circuit, all the circuit current of the wiring 81 and 82 of the positive pole and the negative pole sides flows through the equivalent series inductances L1, L2. Therefore, the noise of a high frequency band is properly blocked by both of the equivalent series inductances L1 and L2, whereby the noise cancellation property for a high frequency band is further enhanced.

FIGS. 22-25 show a solid electrolytic capacitor according to a fifteenth embodiment of the present invention. In the capacitor A5 of this embodiment, unlike the capacitors A1-A4 of the first through the fourteenth embodiments, one of metal plates constituting the cathode 30 comprises a metal case 30A. Other elements are similar to those of the capacitor A4 of the fourteenth embodiment.

Figure 22:
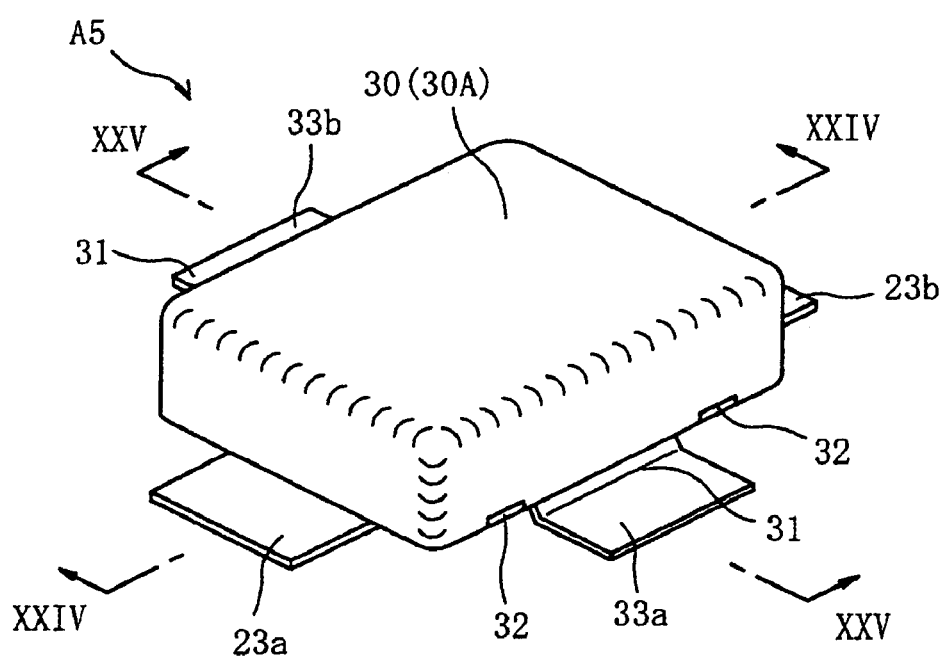
FIG. 22 is a top-side perspective view showing a solid electrolytic capacitor according to a fifteenth embodiment of the present invention.
Figure 23:
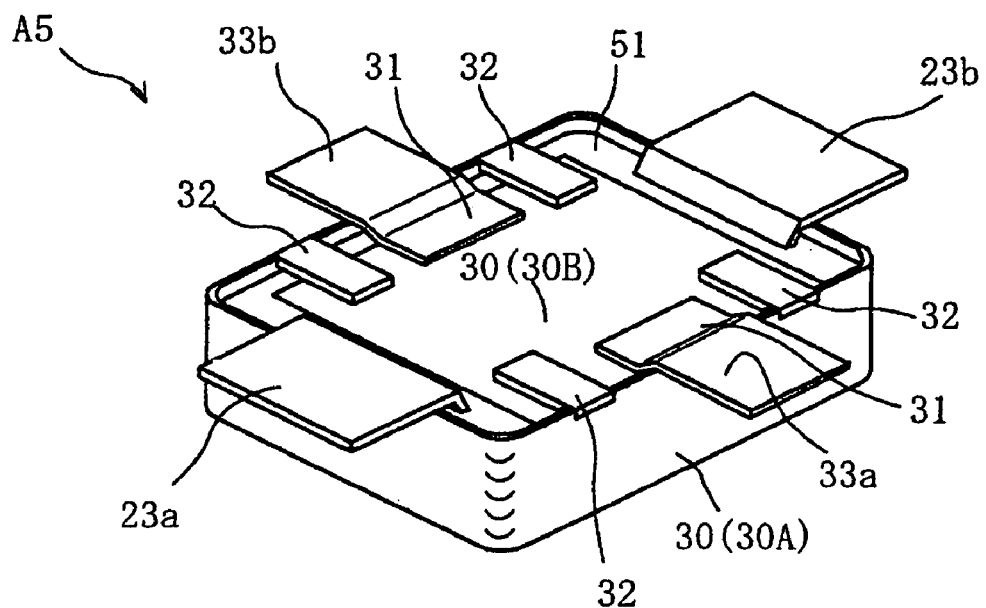
FIG. 23 is a bottom-side perspective view showing another example of solid electrolytic capacitor according to the fifteenth embodiment of the present invention.

As better shown in FIGS. 22 and 23, the capacitor A5 is provided with the metal case 30A. The first and the second anode mount terminals 23a, 23b and the first and the second cathode mount terminals 33a, 33b project from under the metal case 30A.

Figure 24:
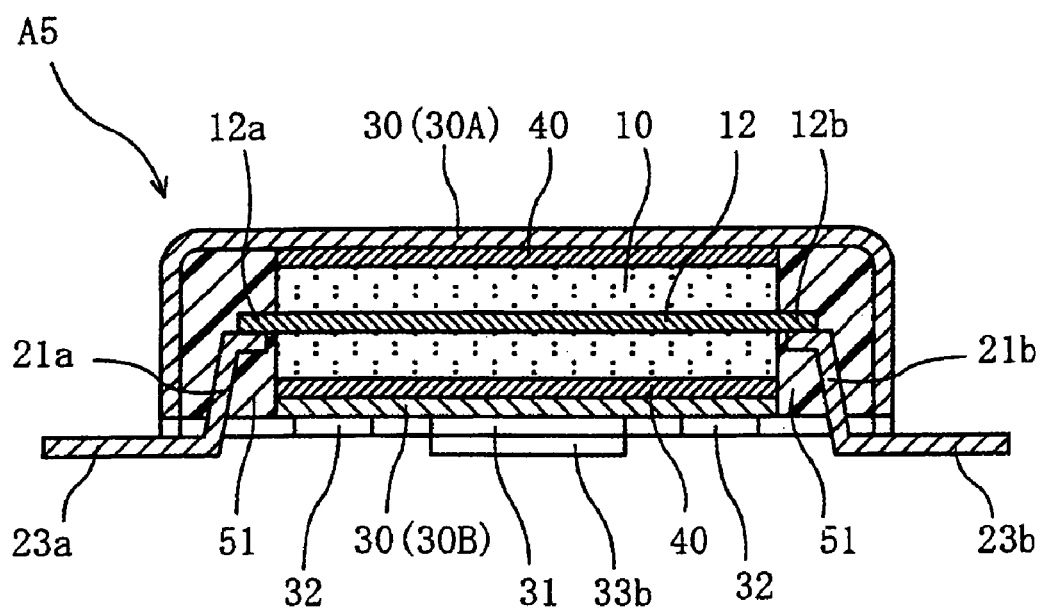
FIG. 24 is a sectional view taken along lines XXIV-XXIV in FIG. 23.
Figure 25:
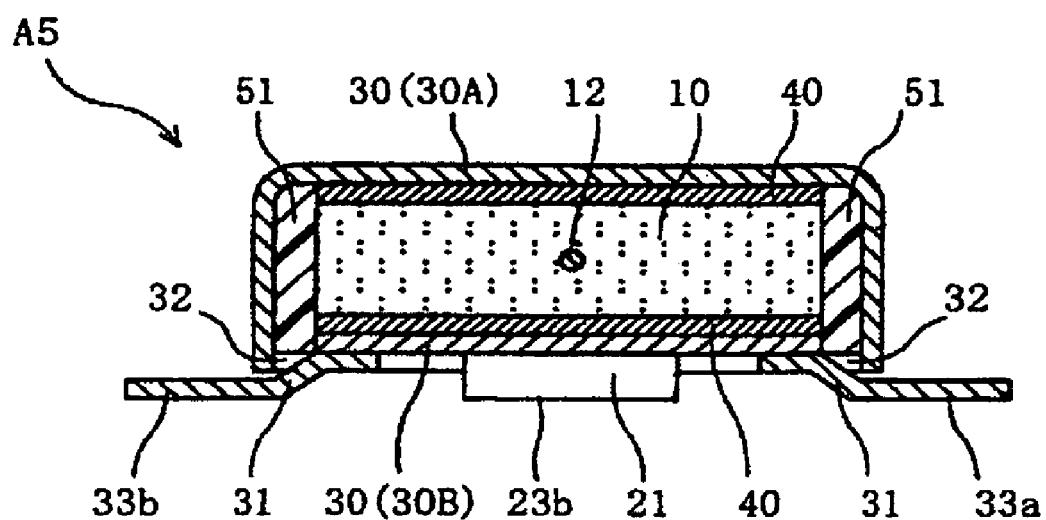
FIG. 25 is a sectional view taken along lines XXV-XXV in FIG. 23.

As better shown in FIGS. 24 and 25, the metal case 30A and the metal, plate 30B constitute the cathode 30. The metal case 30A and the metal plate 30B are bonded to the porous sintered body 10 via conductive resin 40 so as to sandwich the porous sintered body 10. As shown in FIG. 23, a plurality of leads 32 electrically connects the metal case 30A and the metal plate 30B to each other. As shown in FIG. 24, the anode wire 12 has opposite ends projecting from the porous sintered body 10. The opposite ends of the anode wire 12 constitute a first and a second anode terminals 12a and 12b. The first and the second anode terminals 12a and 12b are electrically connected to conductive members 21a and 21b. Spaces in the metal case 30A are filled with sealing resin 51 for providing insulation between parts and blocking outside air.

According to the fifteenth embodiment, since the capacitor A5 is electrically shielded by the metal case 30A and the metal plate 30B, the electrical characteristics of the capacitor A5 are stable. Further, since the metal case 30A is more rigid than a metal plate, the strength of the entire capacitor A5 is enhanced. Further, as shown in FIGS. 24 and 25, the sealing resin 51 is covered by the metal case 30A. Therefore, the sealing resin 51 is less likely to crack as compared with the arrangement in which the entirety is covered by sealing resin. Moreover, the metal case 30A has a heat conductivity which is higher than that of the sealing resin. Therefore, when the porous sintered body 10 is heated up, heat dissipation to the outside is promoted. As a result, the capacitor A5 works stably, and the allowable power loss at the porous sintered body 10 can be increased. The insulation from the outside can be further enhanced when a resin layer is formed on the obverse surface of the metal case 30A.

The solid electrolytic capacitor, electric circuit and mounting structure according to the present invention are not limited to the foregoing embodiments.

In the foregoing embodiments, part of a conductive member connected to a cathode constitutes a cathode-side terminal for surface-mounting. However, the present invention is not limited to such a structure, and the cathode may be integral with the terminal for surface-mounting. For instance, part of the cathode may be extended to have an end serving as the cathode-side terminal for surface-mounting.

The application of a solid electrolytic capacitor according to the present invention is not limited to the noise cancellation or the stabilization of power supply in a circuit typified by a CPU. For instance, the capacitor of the present invention may be used for output leveling of e.g. a DC-DC converter or ripple cancellation for a bypass circuit.

The invention claimed is:

1. A solid electrolytic capacitor comprising:
   a porous sintered body of metal particles or conductive ceramic particles, the sintered body having a first surface and a second surface opposite to the first surface;
   an anode partially inserted in the porous sintered body and partially projecting from the porous sintered body between the first and second surfaces;
   a first cathode plate formed on the first surface of the porous sintered body;
   a second cathode plate formed on the second surface of the porous sintered body and separated from the first cathode plate by intervention of the porous sintered body; and
   a shorting conductive member for shorting between the first and second cathode plates.

2. The solid electrolytic capacitor according to claim 1, wherein the anode comprises a plurality of anode wires.

3. The solid electrolytic capacitor according to claim 1, wherein the anode comprises an anode wire having opposite ends projecting from the porous sintered body.

4. The solid electrolytic capacitor according to claim 1, wherein the porous sintered body is made of niobium particles or niobium oxide particles.

5. The solid electrolytic capacitor according to claim 1, wherein the porous sintered body is in a form of a flat plate.

6. The solid electrolytic capacitor according to claim 5, wherein the porous sintered body includes a side surface standing in a thickness direction between the first and second surfaces; and
   wherein the anode projects from the side surface.

7. The solid electrolytic capacitor according to claim 5, wherein the porous sintered body includes at least two side surfaces standing in a thickness direction between the first and second surfaces; and
   wherein the anode projects from the side surfaces.

8. The solid electrolytic capacitor according to claim 5, wherein the anode is flattened in section.

9. The solid electrolytic capacitor according to claim 1, wherein the anode includes a first anode terminal and a second anode terminal, the first anode terminal being higher in equivalent series inductance than the second anode terminal.

10. A solid electrolytic capacitor comprising:
    a porous sintered body of metal particles or conductive ceramic particles, the sintered body having a first surface and a second surface opposite to the second surface;
    an anode partially inserted in the porous sintered body;
    a first and a second anode terminals provided by portions of the anode which project from the porous sintered body; and
    a cathode formed on an obverse surface of the porous sintered body;
    a first and a second cathode terminals electrically connected to the cathode;
    wherein circuit current flows from the first anode terminal toward the second anode terminal through the porous sintered body;
    wherein circuit current flows from the first cathode terminal toward the second cathode terminal through the cathode;
    wherein the first cathode terminal is higher in equivalent series inductance than the second cathode terminal.

11. A solid electrolytic capacitor comprising:
    a porous sintered body of metal particles or conductive ceramic particles, the sintered body having a first surface and a second surface opposite to the second surface;
    an anode partially inserted in the porous sintered body;
    a first and a second anode terminals provided by portions of the anode which project from the porous sintered body; and
    a cathode formed on an obverse surface of the porous sintered body;
    wherein circuit current flows from the first cathode terminal toward the second cathode terminal through the cathode;
    wherein the cathode includes a pair of metal members sandwiching the porous sintered body; and
    wherein at least one of the paired metal members comprises a metal case accommodating the porous sintered body.

* * * * *